(12) United States Patent
Sakaguchi

(10) Patent No.: US 11,313,460 B2
(45) Date of Patent: Apr. 26, 2022

(54) SHIFT RANGE CONTROL DEVICE

(71) Applicant: DENSO CORPORATION, Kariya (JP)

(72) Inventor: Koji Sakaguchi, Kariya (JP)

(73) Assignee: DENSO CORPORATION, Kariya (JP)

( * ) Notice: Subject to any disclaimer, the term of this patent is extended or adjusted under 35 U.S.C. 154(b) by 192 days.

(21) Appl. No.: 16/865,718

(22) Filed: May 4, 2020

(65) Prior Publication Data

US 2020/0263788 A1    Aug. 20, 2020

Related U.S. Application Data

(63) Continuation of application No. PCT/JP2018/040802, filed on Nov. 2, 2018.

(30) Foreign Application Priority Data

Nov. 6, 2017  (JP) .............................. JP2017-213863

(51) Int. Cl.
    *F16H 61/32*    (2006.01)
    *F16H 61/02*    (2006.01)
    *F16H 61/12*    (2010.01)

(52) U.S. Cl.
CPC .......... *F16H 61/32* (2013.01); *F16H 61/0204* (2013.01); *F16H 61/12* (2013.01); *F16H 2061/1224* (2013.01)

(58) Field of Classification Search
CPC ........ F16H 61/32; F16H 61/0204; F16H 1/12; F16H 2061/1224
See application file for complete search history.

(56) References Cited

U.S. PATENT DOCUMENTS

| | | | |
|---|---|---|---|
| 10,830,344 B1 * | 11/2020 | Sakaguchi | F16H 61/32 |
| 11,209,080 B2 * | 12/2021 | Tachibanada | F16H 61/0204 |
| 2004/0066165 A1 | 4/2004 | Kamio et al. | |
| 2006/0108966 A1 | 5/2006 | Kamio et al. | |
| 2008/0221764 A1 * | 9/2008 | Nagashima | F16H 61/12 701/63 |
| 2010/0116074 A1 * | 5/2010 | Shoda | F16H 61/12 74/473.12 |
| 2013/0076290 A1 | 3/2013 | Yoshida | |
| 2013/0110365 A1 * | 5/2013 | Kimura | F16H 61/32 701/65 |
| 2013/0118375 A1 | 5/2013 | Maeyama et al. | |

(Continued)

FOREIGN PATENT DOCUMENTS

| | | |
|---|---|---|
| JP | 2009-100534 | 5/2009 |
| JP | 2017-198250 | 11/2017 |

*Primary Examiner* — David M Fenstermacher
(74) *Attorney, Agent, or Firm* — Nixon & Vanderhye P.C.

(57) ABSTRACT

A shift range control device controls switching of a shift range by controlling a drive of a motor, and includes a signal acquisition unit and a drive control unit. The signal acquisition unit acquires the rotation angle signal from the encoder that outputs rotation angle signals of three or more phases with different phases. The drive control unit controls the drive of the motor so that a rotational position of the motor becomes the target rotational position according to the target shift range. When an abnormality of the rotation angle signal is detected during switching of the shift range, the drive control unit performs fixed phase energization that continues energization to the same energized phase, and stops rotation of the motor.

4 Claims, 12 Drawing Sheets

(56) References Cited

U.S. PATENT DOCUMENTS

| | | | |
|---|---|---|---|
| 2015/0142283 A1* | 5/2015 | Ono | F16H 61/32 |
| | | | 701/60 |
| 2016/0017989 A1* | 1/2016 | Shigenaga | F16H 61/143 |
| | | | 192/3.29 |
| 2017/0108118 A1* | 4/2017 | Yoon | F16H 61/32 |
| 2017/0166202 A1* | 6/2017 | Kobayashi | B60W 10/08 |
| 2017/0299054 A1* | 10/2017 | Kurita | F16H 61/32 |
| 2017/0307074 A1* | 10/2017 | Yamada | H02P 27/085 |
| 2018/0106364 A1* | 4/2018 | Wozniak | B60T 8/58 |
| 2018/0180177 A1* | 6/2018 | Cha | F16H 61/0006 |
| 2018/0222481 A1* | 8/2018 | Okada | F16D 48/066 |
| 2020/0040989 A1* | 2/2020 | Terai | F16H 61/0248 |
| 2021/0390801 A1* | 12/2021 | Tabata | F16H 61/12 |

\* cited by examiner

| NUMBER | ENCODER PATTERN | | | | ENERGIZED PHASE |
|---|---|---|---|---|---|
| | A-PHASE | B-PHASE | C-PHASE | STATE | |
| (0) | 0 (Lo) | 0 (Lo) | 1 (Hi) | NORMAL | V |
| (1) | 0 (Lo) | 1 (Hi) | 1 (Hi) | NORMAL | UV |
| (2) | 0 (Lo) | 1 (Hi) | 0 (Lo) | NORMAL | U |
| (3) | 1 (Hi) | 1 (Hi) | 0 (Lo) | NORMAL | WU |
| (4) | 1 (Hi) | 0 (Lo) | 0 (Lo) | NORMAL | W |
| (5) | 1 (Hi) | 0 (Lo) | 1 (Hi) | NORMAL | VW |
| (6) | 1 (Hi) | 1 (Hi) | 1 (Hi) | ABNORMAL | — |
| (7) | 0 (Lo) | 0 (Lo) | 0 (Lo) | ABNORMAL | — |

SHIFT RANGE CONTROL DEVICE

CROSS REFERENCE TO RELATED APPLICATIONS

This application is a continuation application of International Patent Application No. PCT/JP2018/040802 filed on Nov. 2, 2018, which designated the U.S. and based on and claims the benefits of priority of Japanese Patent Application No. 2017-213863 filed on Nov. 6, 2017. The entire disclosure of all of the above applications is incorporated herein by reference.

TECHNICAL FIELD

The present disclosure relates to a shift range control device.

BACKGROUND

A motor control device switches a shift range of a vehicle by using a motor as a drive source.

SUMMARY

An object of the present disclosure is to provide a shift range control device that appropriately switches a shift range even when an abnormality occurs in a signal from a rotation angle sensor.

A shift range control device according to the present disclosure controls switching of a shift range by controlling a drive of a motor, and includes a signal acquisition unit and a drive control unit. The signal acquisition unit acquires a rotation angle signal from a rotation angle sensor that can output rotation angle signals of three or more phases with different phases. The drive control unit controls the drive of the motor so that a rotation position of the motor becomes a target rotation position according to a target shift range. When an abnormality of the rotation angle signal is detected during switching of the shift range, the drive control unit performs fixed phase energization that continues energization to the same energized phase, and stops rotation of the motor.

BRIEF DESCRIPTION OF DRAWINGS

The above and other objects, features and advantages of the present disclosure will become more apparent from the following detailed description made with reference to the accompanying drawings. In the drawings.

DETAILED DESCRIPTION

First Embodiment

A shift range control device will be hereinafter described with reference to the drawings. Hereinafter, in a plurality of embodiments, a substantially equivalent configuration will be denoted by an identical reference, and explanation thereof will be omitted.

Figure 1:
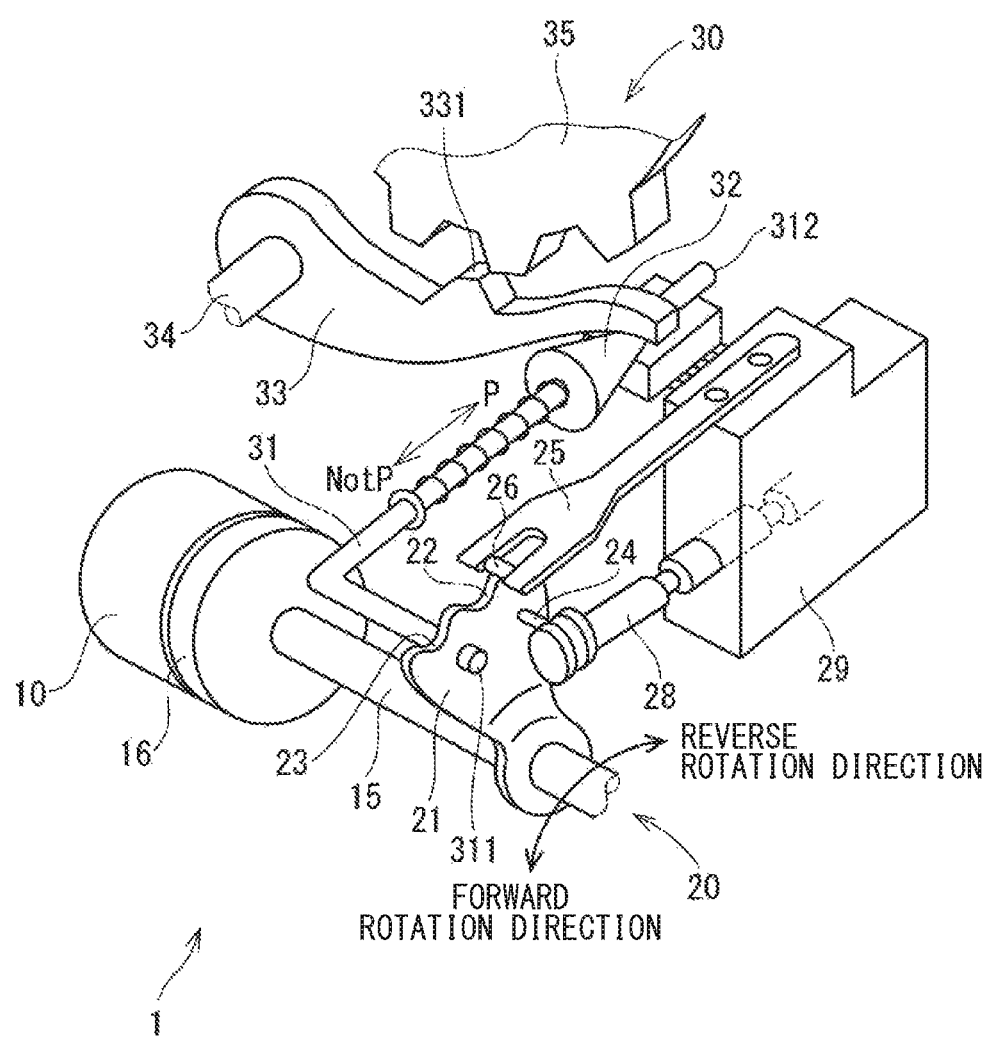
FIG. 1 is a perspective view showing a shift-by-wire system according to a first embodiment.
Figure 2:
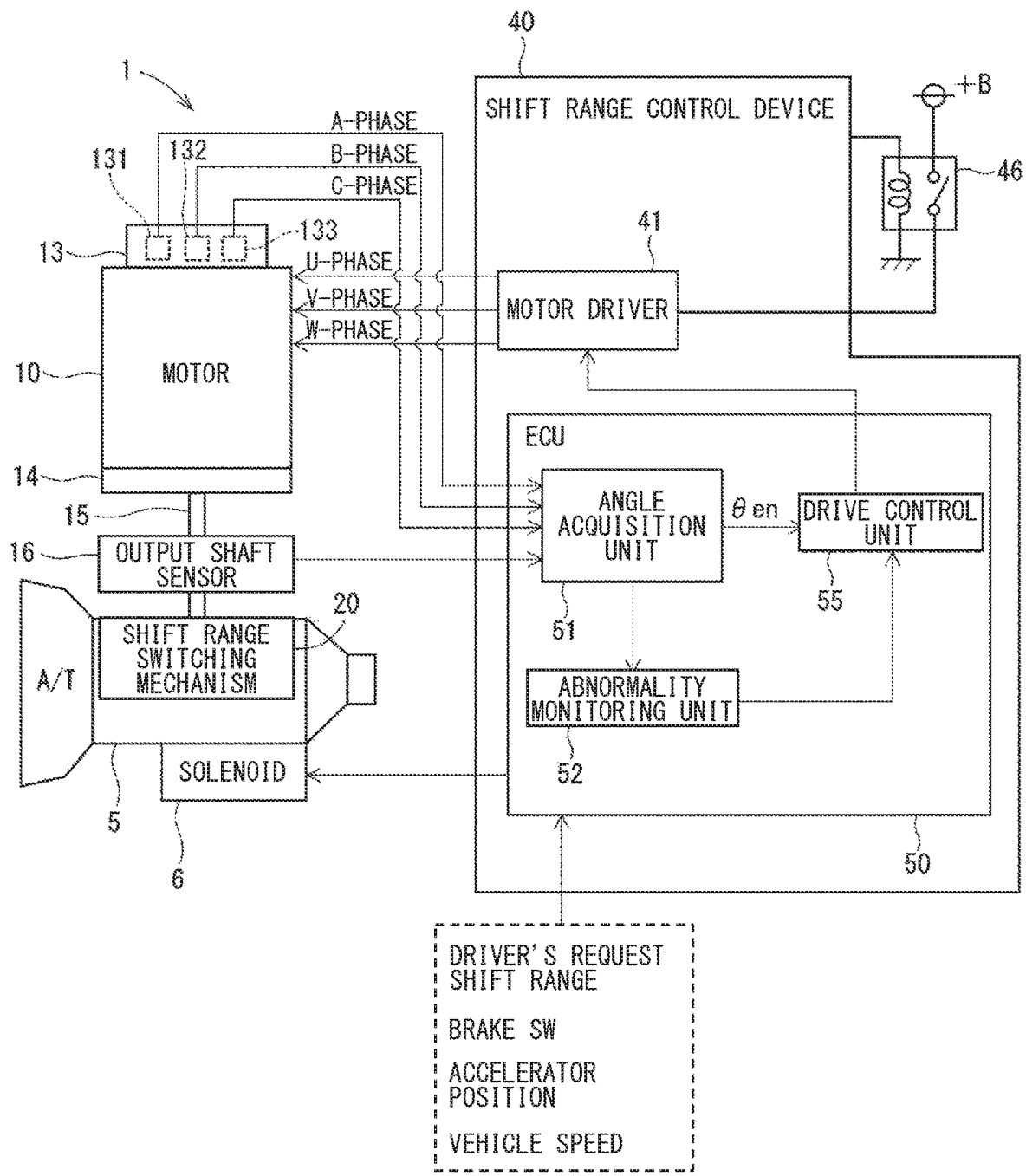
FIG. 2 is a schematic configuration diagram showing the shift-by-wire system according to the first embodiment.

The shift range control device according to a first embodiment is shown in FIGS. 1 to 7. As shown in FIGS. 1 and 2, a shift-by-wire system 1 includes, for example, a motor 10, a shift range switching mechanism 20, a parking lock mechanism 30, and a shift range control device 40.

The motor 10 rotates by being supplied with electric power from a battery mounted in a vehicle (not shown), and functions as a drive source for the shift range switching mechanism 20. Although the motor 10 of the present embodiment is a switch reluctance motor, the motor may be any type of motor such as a DC motor.

Figure 3:
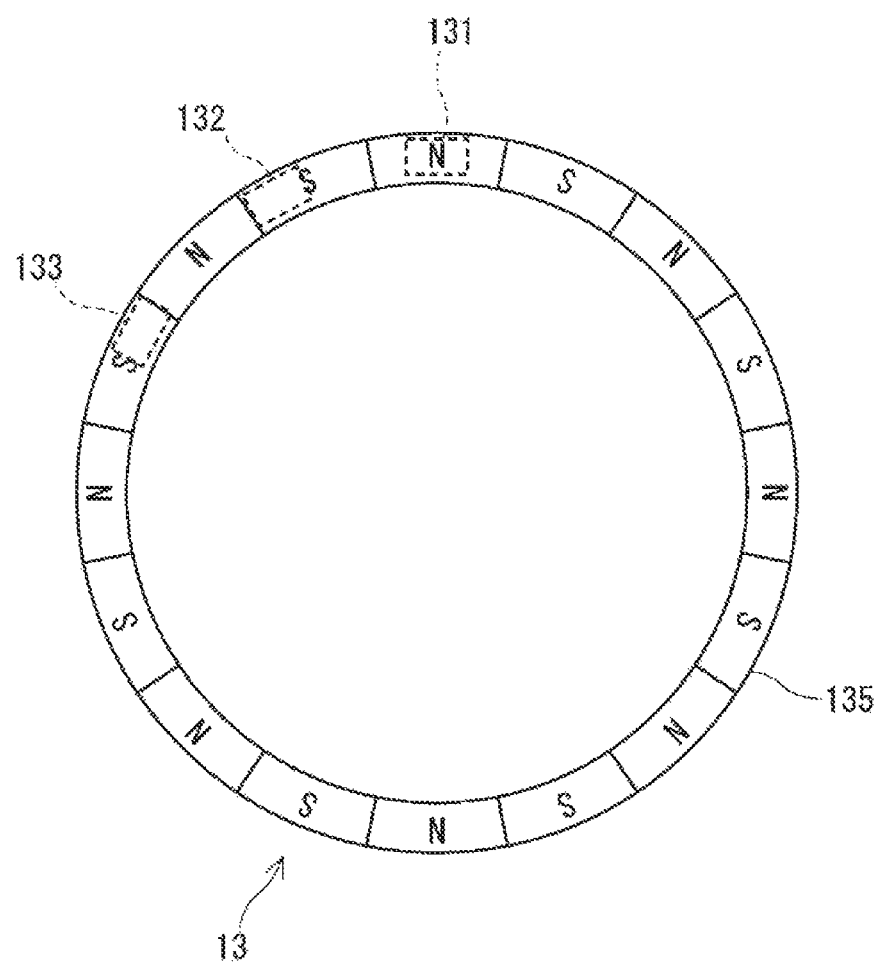
FIG. 3 is a schematic diagram illustrating an arrangement of Hall ICs of an encoder according to the first embodiment.

As shown in FIGS. 2 and 3, an encoder 13 detects a rotation position of a rotor (not shown) of the motor 10, and outputs a rotation angle signal corresponding to an electrical angle. The encoder 13 is, for example, a magnetic type rotary encoder, and is a three-phase encoder including a magnet plate 135 that rotates integrally with the rotor and Hall ICs 131, 132, and 133 for detecting magnetism. Each of the Hall ICs 131 to 133 has a Hall element that outputs a voltage corresponding to the direction and magnitude of the magnetic field, and outputs a digital signal obtained by digitally converting an analog signal of the Hall element to the shift range control device 40 as a rotation angle signal. As shown in FIG. 3, the Hall ICs 131 to 133 are arranged such that the phase of the rotation angle signal is respectively shifted by 120° in electrical angle. Hereinafter, the rotation angle signal output from the Hall IC 131 is referred to as an A-phase signal, the rotation angle signal output from the Hall IC 132 is referred to as a B-phase signal, and the rotation angle signal output from the Hall IC 133 is referred to as a C-phase signal.

A decelerator 14 is provided between a motor shaft of the motor 10 and an output shaft 15 to decelerate the rotation of the motor 10 and output the rotation to the output shaft 15. The rotation of the motor 10 is thus transmitted to the shift range switching mechanism 20. An output shaft sensor 16 for detecting an angle of the output shaft 15 is provided on the output shaft 15. The output shaft sensor 16 is, for example, a potentiometer.

As shown in FIG. 1, the shift range switching mechanism 20 includes a detent plate 21, a detent spring 25 and the like. The shift range switching mechanism 20 transmits the rotational drive force output from the decelerator 14 to a manual valve 28 and a parking lock mechanism 30.

The detent plate 21 is fixed to the output shaft 15 and driven by the motor 10. In the present embodiment, a direction in which the detent plate 21 is separated from the base of the detent spring 25 is defined as a forward rotation direction, and a direction in which the detent plate 21 approaches the base is defined as a reverse rotation direction.

The detent plate 21 has a pin 24 protruding in parallel with the output shaft 15. The pin 24 is connected to the manual valve 28. As the detent plate 21 is driven by the motor 10, the manual valve 28 moves back and forth in the axial direction. That is, the shift range switching mechanism 20 converts the rotational motion of the motor 10 into a linear motion and transmits the linear motion to the manual valve 28. The manual valve 28 is provided on a valve body 29. When the manual valve 28 moves back and forth in the axial direction to switch hydraulic pressure supply paths, which are lead to a hydraulic clutch (not shown), thereby to switch an engagement state of the hydraulic clutch. In this way, the shift range is switched.

Two recesses 22 and 23 are provided in the detent plate 21 on the detent spring 25 side. In the present embodiment, the side closer to the base of the detent spring 25 is the recess 22 and the side farther therefrom is the recess 23.

In the present embodiment, the recess 22 corresponds to a not-P (NotP) range except for a P range, and the recess 23 corresponds to the P range.

The detent spring 25 is an elastically deformable plate-like member, and is provided with a detent roller 26 at a tip of the detent spring 25. The detent spring 25 biases the detent roller 26 toward a rotation center of the detent plate 21. When a rotational force equal to or greater than a predetermined force is applied to the detent plate 21, the detent spring 25 is elastically deformed, and the detent roller 26 moves between the recesses 22 and 23. When the detent roller 26 is fitted to any of the recesses 22 and 23, swing of the detent plate 21 is regulated. Accordingly, an axial position of the manual valve 28 and the state of the parking lock mechanism 30 are determined to fix the shift range of an automatic transmission 5. The detent roller 26 fits into the recess 22 when the shift range is the NotP range, and fits into the recess 23 when the shift range is the P range.

The parking lock mechanism 30 includes a parking rod 31, a conical member 32, a parking lock pawl 33, a shaft part 34 and a parking gear 35. The parking rod 31 is formed in a substantially L-shape. The parking rod 31 is fixed to the detent plate 21 on the side of one end 311. The conical member 32 is provided to the other end 312 of the parking rod 31. The conical member 32 is formed to reduce in diameter toward the other end 312. When the detent plate 21 pivots in the reverse rotation direction, the conical member 32 moves in a P direction. The parking gear 35 is provided on an axle (not shown) and is enabled to mesh with the protrusion 331 of the parking lock pawl 33. When the parking gear 35 meshes with the protrusion 331, rotation of the axle is restricted. When the shift range is the NotP range, the parking gear 35 is not locked by the parking lock pawl 33 and the rotation of the axle is not restricted by the parking lock mechanism 30. When the shift range is the P range, the parking gear 35 is locked by the parking lock pawl 33 and the rotation of the axle is restricted.

As shown in FIG. 2, the shift range control device 40 includes a motor driver 41, an ECU 50 and the like. The motor driver 41 switches energization to each phase (U-phase, V-phase, W-phase) of the motor 10. A motor relay 46 is provided between the motor driver 41 and a battery. The motor relay 46 is turned on while a start switch of the vehicle, such as an ignition switch, is turned on, so that power is supplied to the motor 10 side. The motor relay 46 is turned off when the start switch is turned off, so that power supply to the motor 10 side is shut down.

ECU 50 is mainly composed of a microcomputer and the like, and internally includes, although not shown in the figure, a CPU, a ROM, a RAM, an I/O, a bus line for connecting these components, and the like. Each process executed by the ECU 50 may be software processing or may be hardware processing. The software processing may be implemented by causing a CPU to execute a program. The program may be stored beforehand in a material memory device such as a ROM, that is, in a readable non-transitory tangible storage medium. The hardware processing may be implemented by a special purpose electronic circuit.

The ECU 50 controls the switching of the shift range by controlling the drive of the motor 10 based on the driver's request shift range, a signal from a brake switch, a vehicle speed, and the like. The ECU 50 performs a control to drive a transmission hydraulic control solenoid 6 based on a vehicle speed, an accelerator position, a shift range requested by a driver, and the like. The transmission hydraulic control solenoid 6 is controlled to manipulate a shift stage. The number of the shift hydraulic pressure control solenoids 6 is determined according to the shift stage or the like. According to the present embodiment, a singular ECU 50 performs the control to drive the motor 10 and the solenoid 6. It is noted that, the ECU may be divided into a motor ECU, which is for motor control to control the motor 10, and an AT-ECU, which is for solenoid control. Hereinafter, a drive control of the motor 10 will be mainly described.

The ECU 50 has a signal acquisition unit 51, an abnormality monitoring unit 52, and a drive control unit 55. The signal acquisition unit 51 acquires a rotation angle signal from the encoder 13 and a signal from the output shaft sensor 16. The signal acquisition unit 51 reads an encoder pattern every time a pulse edge of the rotation angle signal from the encoder 13 is interrupted. In addition, the signal acquisition unit 51 counts up or down the encoder count value θen according to the signal pattern for each encoder pulse edge. The encoder count value θen is a value corresponding to the rotation position of the motor 10, and corresponds to "the rotation position of the motor" in the present embodiment. The abnormality monitoring unit 52 monitors the abnormality of the rotation angle signal of the encoder 13.

The drive control unit 55 controls the drive of the motor 10 so that the motor 10 stops at a rotation position where the encoder count value θen based on the rotation angle signal from the encoder 13 becomes the target count value θcmd according to the target shift range. In the present embodiment, the encoder count value θen corresponds to "the rotation position of the motor", and the target count value θcmd corresponds to "the target rotation position".

Figures 4A, 4B:
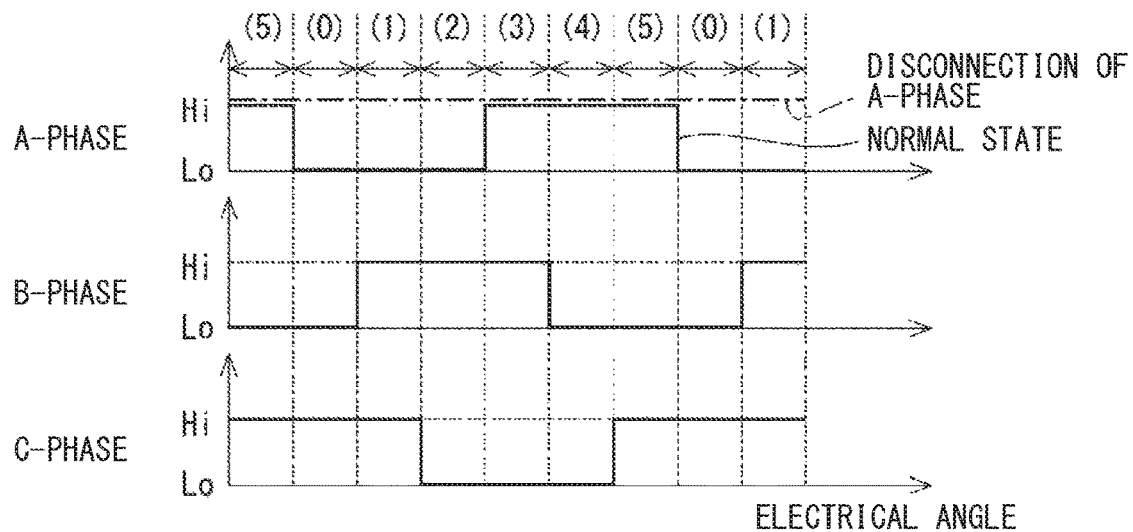
FIG. 4A is an explanatory diagram illustrating an encoder pattern and an energized phase according to an electrical angle according to the first embodiment.
FIG. 4B is an explanatory diagram illustrating energized phases according to an encoder pattern according to the first embodiment.

The rotation angle signal of the encoder 13 and the energized phase corresponding to the rotation angle signal will be described with reference to FIGS. 4A and 4B. FIG. 4A is a diagram illustrating an encoder pattern and an energized phase according to the electrical angle, and FIG. 4B is a map illustrating the energized phase according to the encoder pattern. In FIGS. 4A and 4B, numbers (0) to (7) are pattern numbers indicating signal patterns and energized phase patterns corresponding to the signal patterns. In FIGS. 4A and 4B, the state where the rotation angle signal is Lo is described as "0 (Lo)", and the state where the rotation angle signal is Hi is described as "1 (Hi)". The same also applies to the following embodiments.

Pattern (0): A signal pattern in which the A-phase signal and the B-phase signal are Lo and the C-phase signal is Hi is pattern 0, and the energized phase in the pattern 0 is referred to as V-phase.

Pattern (1): A signal pattern in which the A-phase signal is Lo, the B-phase signal and the C-phase signal are Hi is pattern 1, and the energized phases in the pattern 1 are referred to as U-phase and V-phase.

Pattern (2): A signal pattern in which the A-phase signal and the C-phase signal are Lo and the B-phase signal is Hi is pattern 0, and the energized phase in the pattern 2 is referred to as U-phase.

Pattern (3): A signal pattern in which the A-phase signal and the B-phase signal are Hi and the C-phase signal is Lo is pattern 3, and the energized phases in the pattern 3 are referred to as W-phase and U-phase.

Pattern (4): A signal pattern in which the A-phase signal is Hi, the B-phase signal and the C-phase signal are Lo is pattern 4, and the energized phase in the pattern 4 is referred to as W-phase.

Pattern (5): A signal pattern in which the A-phase signal and the C-phase signal are Hi and the B-phase signal is Lo is pattern 5, and the energized phases in the pattern 5 are referred to as V-phase and W-phase.

The patterns (0) to (5) are normal patterns. When the motor 10 is rotated, the energized phase is switched in the order of V→UV→U→WU→W→WV→VW→V→UV→according to the signal pattern every time a pulse edge of the rotation angle signal from the encoder 13 is interrupted. When the motor is rotated in the reverse direction, the energized phase is switched in the reverse order.

Pattern (6): A signal pattern in which the A-phase signal, the B-phase signal, and the C-phase signal are all Hi is pattern 6. Pattern (7): A signal pattern in which the A-phase signal, the B-phase signal, and the C-phase signal are all Lo is pattern 7. The pattern (6) and the pattern (7) in which the A-phase signal, the B-phase signal, and the C-phase signal are all Hi or Lo are abnormal patterns that do not occur in a normal state. For example, as shown by a dashed line in FIG. 4A, when the A-phase signal is fixed to Hi due to the A-phase disconnection of the encoder 13, the pattern (6) is generated at the timing to be switched to the pattern (1). For the sake of explanation, the Hi fixed signal generated at the time of disconnection of the A-phase is described as being shifted from the Hi signal in the normal state.

By the way, as a reference example, in a two-phase encoder system having A-phase and B-phase, if a one-phase signal becomes abnormal due to, for example, a disconnection or the like, energization control of the motor cannot be performed correctly, and the motor immediately stops. As a supplement, since the Z-phase pulse is a reference signal and not a "rotation angle signal", the Z-phase pulse cannot be used for motor control.

On the other hand, in the present embodiment, the encoder 13 is a three-phase encoder system having A-phase, B-phase, and C-phase. In the case of the three-phase encoder system, as described with reference to FIG. 4B, the energized phase is uniquely determined with respect to the signal pattern. Therefore, even if one of the three phases is disconnected, the range in which the abnormal pattern is generated is jumped to next pattern, so that the motor may rotate as a result. When the range in which the abnormal pattern is generated is not jumped to next pattern, the motor 10 stops. That is, when the control of the motor is continued in a state where an abnormal pattern has occurred in the rotation angle signal of the encoder 13, whether the motor 10 continues to rotate or stops is determined by a state of the environment, such as the rotation speed, temperature, voltage, etc. of the motor 10 at that time.

For example, if the control of the motor is switched according to the behavior of the motor 10 when the rotation angle signal of the encoder 13 becomes abnormal, the configuration for the control becomes complicated. Further, if the motor 10 rotates in a state where the rotation angle signal is abnormal, the rotation angle of the motor 10 is erroneously detected.

Therefore, in the present embodiment, when an abnormality of the rotation angle signal of the encoder 13 is detected, the motor 10 is surely stopped by a fixed phase energization. Afterwards, the motor 10 is rotated to the target position by performing the open control that switches the energized phase every energized phase switching time without using the encoder count value θen. The fixed phase energization may be two-phase energization or one-phase energization in any of the later-described fail stop mode and stop mode.

The encoder interrupt process will be described based on the flowchart of FIG. 5. The ECU 50 executes this process at the timing when the pulse edge of the rotation angle signal from the encoder 13 is detected. Hereinafter, "step" in step S101 is omitted, and is simply referred to as a symbol "S." The other steps are the same.

In S101, the signal acquisition unit 51 reads an encoder pattern based on the rotation angle signal from the encoder 13. In S102, the signal acquisition unit 51 counts up or down the encoder count value θen based on the encoder pattern. The count process may use, for example, the method disclosed in Japanese Patent No. 5397443.

In S103, the abnormality monitoring unit 52 determines whether the encoder pattern is normal. When it is determined that the encoder pattern is normal (S103: YES), the process proceeds to S105. When it is determined that the encoder pattern is not normal (S103: NO), the process proceeds to S104, and a flag for an open drive request is set.

In S105, the drive control unit 55 determines whether the drive mode is the feedback mode. Hereinafter, the feedback is referred to as "F/B" as appropriate. A process related to mode selection will be described later. When it is determined that the drive mode is not the F/B mode (S105: NO), the process of S106 is not performed, and this routine ends. When it is determined that the drive mode is the F/B mode (S105: YES), the process proceeds to S106, and an energization process for energizing the energized phase according to the encoder pattern is performed as shown in FIG. 4B.

Figure 6:
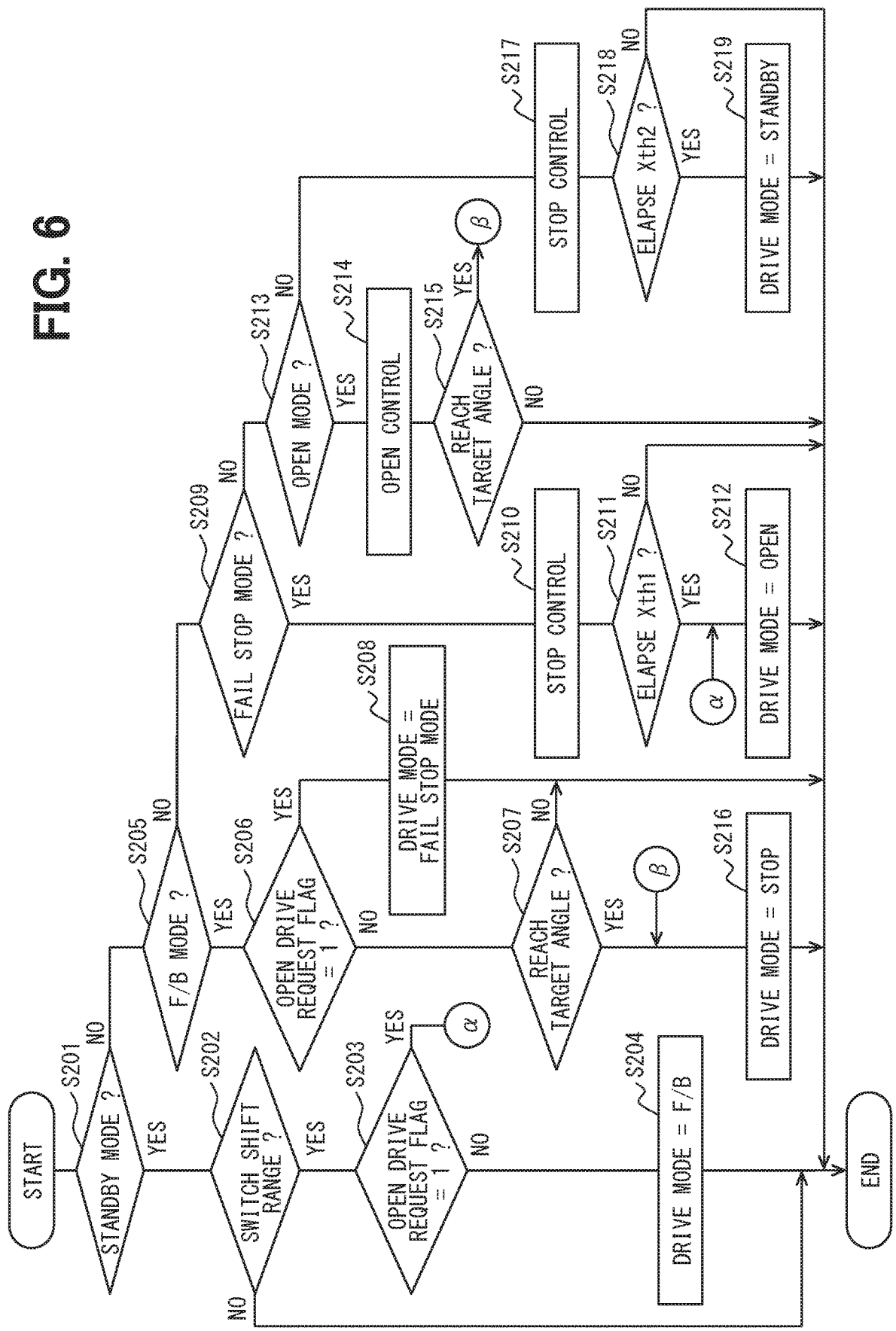
FIG. 6 is a flowchart illustrating a drive control process according to the first embodiment.

The drive control process will be described based on the flowchart of FIG. 6. The ECU 50 executes this process at a predetermined cycle (for example, 1 ms) when a vehicle start switch such as an ignition switch is turned on. After the microcomputer is initialized, a standby mode is set.

In S201, the drive control unit 55 determines whether the drive mode is the standby mode. When it is determined that the drive mode is not the standby mode (S201: NO), the process proceeds to S205. When it is determined that the drive mode is the standby mode (S201: YES), the process proceeds to S202.

In S202, the drive control unit 55 determines whether the target shift range has been switched. When it is determined that the target shift range has not been switched (S202: NO), this routine ends. When it is determined that the target shift range has been switched (S202: YES), the process proceeds to S203.

In S203, the drive control unit 55 determines whether the flag for the open drive request has been set. When it is determined that the open drive request flag is set (S203:

YES), the process proceeds to S212, and the drive mode is set to the open drive mode. When it is determined that the open drive request flag is not set (S203: NO), the process proceeds to S204, and the drive mode is set to the F/B mode.

In S205, when it is determined that the drive mode is not the standby mode (S201: NO), the drive control unit 55 determines whether the drive mode is the F/B mode. When it is determined that the drive mode is not the F/B mode (S205: NO), the process proceeds to S209. When it is determined that the drive mode is the F/B mode (S205: YES), the process proceeds to S206.

In S206, the drive control unit 55 determines whether the flag for the open drive request has been set. When it is determined that the open drive request flag is set (S206: YES), the process proceeds to S208, and the drive mode is set to the fail stop mode. When it is determined that the open drive request flag has not been set (S206: NO), the process proceeds to S207. When it is determined that the open drive request flag has not been set in S206, the drive mode is the F/B mode, and the motor 10 is driven by the F/B control. In the F/B mode, as described with reference to FIGS. 4A, 4B, and 5, the drive of the motor 10 is controlled by switching the energized phase according to the signal pattern every time the encoder is interrupted.

In S207, the drive control unit 55 determines whether the rotation position of the motor 10 has reached the target position (angle). In the state where the motor 10 is driven by the F/B control, when the difference between the encoder count value θen and the target count value θcmd becomes equal to or smaller than a predetermined count (for example, 2 counts), it is determined that the rotational position of the motor 10 has reached the target position. When it is determined that the rotation position of the motor 10 has not reached the target position (S207: NO), this routine ends. When it is determined that the rotation position of the motor 10 has reached the target position (S207: YES), the process proceeds to S216, and the drive mode is set to the stop mode.

When it is determined that the drive mode is not the F/B mode (S205: NO), in S209, the drive control unit 55 determines whether the drive mode is the fail stop mode. When it is determined that the drive mode is not the fail stop mode (S209: NO), the process proceeds to S213. When it is determined that the drive mode is the fail stop mode (S209: YES), the process proceeds to S210, and stop control is performed to stop the motor 10 by energizing the fixed phase.

In S211, the drive control unit 55 determines whether an elapsed time from the start of the fixed phase energization in the fail stop mode has exceeded a first determination time Xth1. The first determination time Xth1 is set to a time during which the motor 10 can reliably stop in the fail stop mode. When it is determined that the elapsed time from the start of the fixed phase energization in the fail stop mode has not elapsed the first determination time Xth1 (S211: NO), the fixed phase energization in the fail stop mode is continued, and this routine ends. When it is determined that the elapsed time from the start of the fixed phase energization in the fail stop mode has exceeded the first determination time Xth1 (S211: YES), the process proceeds to S212, and the drive mode is set to the open drive mode.

In S213, when it is determined that the drive mode is not the fail stop mode (S209: NO), the drive control unit 55 determines whether the drive mode is the open drive mode. When it is determined that the drive mode is not the open drive mode (S213: NO), that is, when the drive mode is the stop mode, the process proceeds to S217. When it is determined that the drive mode is the open drive mode (S213: YES), the process proceeds to S214.

In S214, the drive control unit 55 drives the motor 10 by performing the open control. In the open control, the motor 10 is driven by switching the energized phase every predetermined time without using the encoder count value θen. The switching pattern of the energized phase is the same as the switching pattern in the normal state described with reference to FIGS. 4A and 4B.

In S215, the drive control unit 55 determines whether the rotation position of the motor 10 has reached the target position (angle). When the motor 10 is driven by performing the open control, the energized phase switching counter is incremented or decremented each time the energized phase is switched in accordance with the rotation direction of the motor 10. The drive control unit 55 determines to reach the target position based on the count number set according to the request shift range. When it is determined that the rotation position of the motor 10 has not reached the target position (S215: NO), the open control is continued, and this routine ends. When it is determined that the rotation position of the motor 10 has reached the target position (S215: YES), the process proceeds to S216, and the drive mode is set to the stop mode.

In S217, when it is determined that the drive mode is the stop mode, the drive control unit 55 performs stop control for stopping the motor 10 by energizing the fixed phase. In S218, the drive control unit 55 determines whether the second determination time Xth2 has elapsed since the start of the fixed phase energization in the stop mode. The second determination time Xth2 is set to a time during which the motor 10 can reliably stop in the stop mode. The second determination time Xth2 may be the same as or different from the first determination time Xth1 that is the determination time in the fail stop mode. When it is determined that the second determination time Xth2 has not elapsed (S218: NO), the fixed phase energization in the stop mode is continued, and this routine ends. When it is determined that the second determination time Xth2 has elapsed (S218: YES), the process proceeds to S219, and the drive mode is set to the standby mode.

Figure 7:
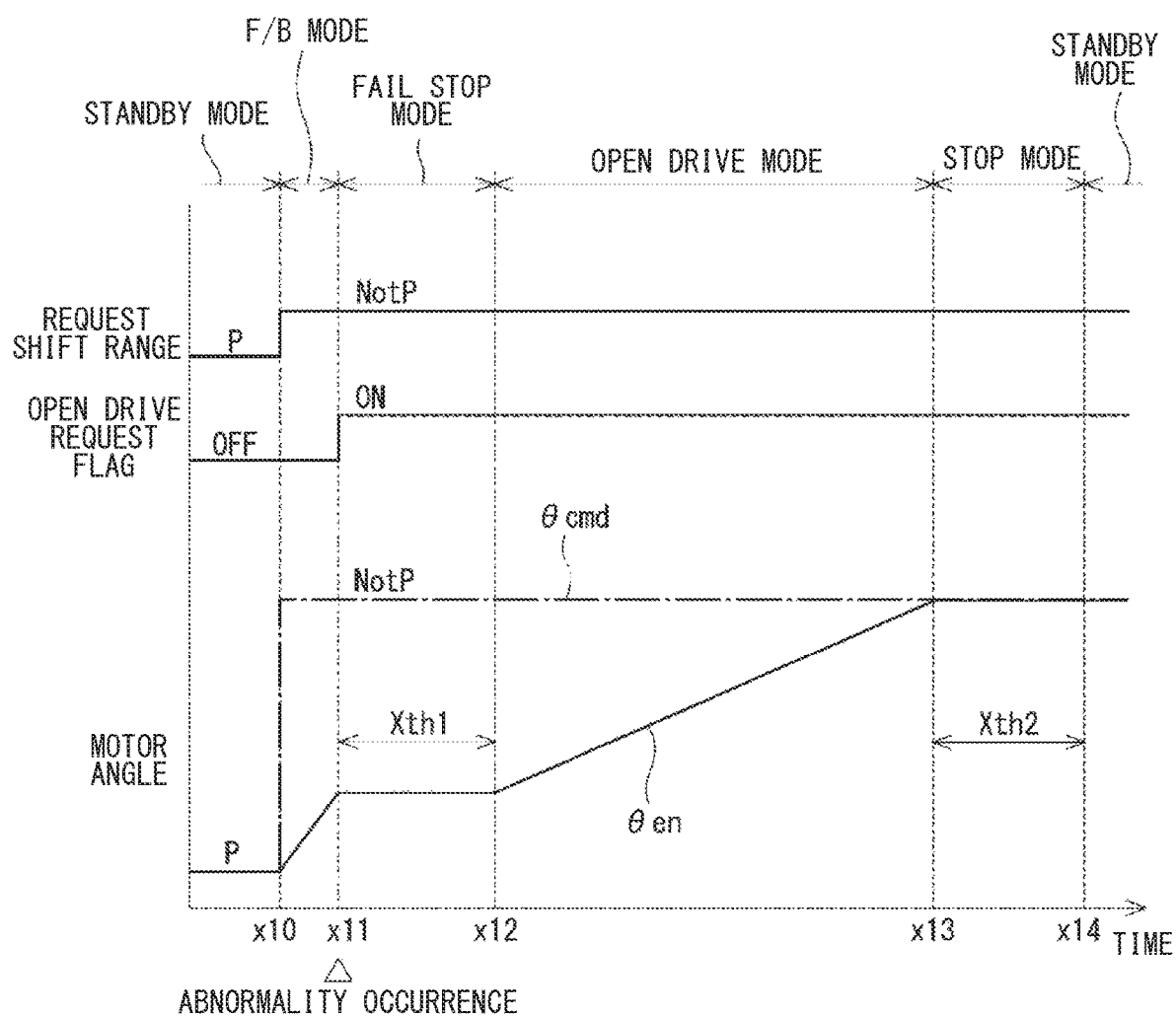
FIG. 7 is a time chart illustrating a motor drive process according to the first embodiment.

The motor drive process will be described with reference to the time chart of FIG. 7. In FIG. 7, the request shift range, the open drive request flag, and the motor angle are shown from the top of the vertical axis. The motor angle is indicated by the encoder count value. For the sake of explanation, the time scale is appropriately changed and does not always match the actual time scale. The same applies to the time chart of the embodiment described later.

At time x10, when the request shift range is switched from the P range to the NotP range other than the P range, the drive of the motor 10 is started. At this time, since the encoder 13 is normal, the energized phase is switched based on the energized pattern N, which is a normal energized pattern based on the rotation angle signal of the encoder 13, and the drive of the motor 10 is controlled by the F/B control.

At time x11, when an abnormal pattern of the encoder 13 is detected, the open drive request flag is set. When the open drive request flag is set, the fixed phase energization is performed in the fail stop mode, and the motor 10 is reliably stopped. At time x12 when the first determination time Xth1 has elapsed from the start of the fixed phase energization in the fail stop mode, the drive mode is switched to the open drive mode, and the drive of the motor 10 is restarted by performing the open control.

At time x13, when the rotation position of the motor 10 reaches the target position, the mode shifts from the open drive mode to the stop mode, and the motor 10 is stopped by performing the fixed phase energization. Then, at time x14 when the second determination time Xth2 has elapsed from time x13, the fixed phase energization is terminated, and the mode shifts to the standby mode.

As described above, the shift range control device of the present embodiment controls the switching of the shift range by controlling the drive of the motor 10, and includes the signal acquisition unit 51 and the drive control unit 55. The signal acquisition unit 51 acquires the rotation angle signal from the encoder 13 that can output rotation angle signals of three or more phases with different phases. The drive control unit 55 controls the drive of the motor 10 so that a rotational position of the motor 10 becomes the target rotational position according to the target shift range. When an abnormality of the rotation angle signal is detected during switching of the shift range, the drive control unit 55 performs fixed-phase energization that continues energization to the same energized phase, and stops rotation of the motor 10.

In the present disclosure, a three-phase encoder is used. Even if an abnormality occurs in one phase, the power is correctly supplied if the phase jumps over that phase, so that the motor may rotate as a result. Therefore, when an abnormality occurs in the encoder 13 irrespective of the situation or environment at the time of occurrence of the abnormality, the motor 10 is reliably stopped by performing the fixed phase energization. After that, the motor 10 is rotated by performing, for example, the open control. Thereby, the shift range can be appropriately switched.

The drive control unit 55 detects the abnormality of the rotation angle signal during the switching of the shift range, stops the motor 10 by performing the fixed phase energization for the first determination time Xth1. Thereafter, the drive control unit 55 shifts the open control that rotates the motor 10 by switching the energized phase without using the rotation angle signal. Thus, the shift range can be appropriately switched by simplified control without being affected by an abnormal encoder pattern.

Second Embodiment

Figure 8:
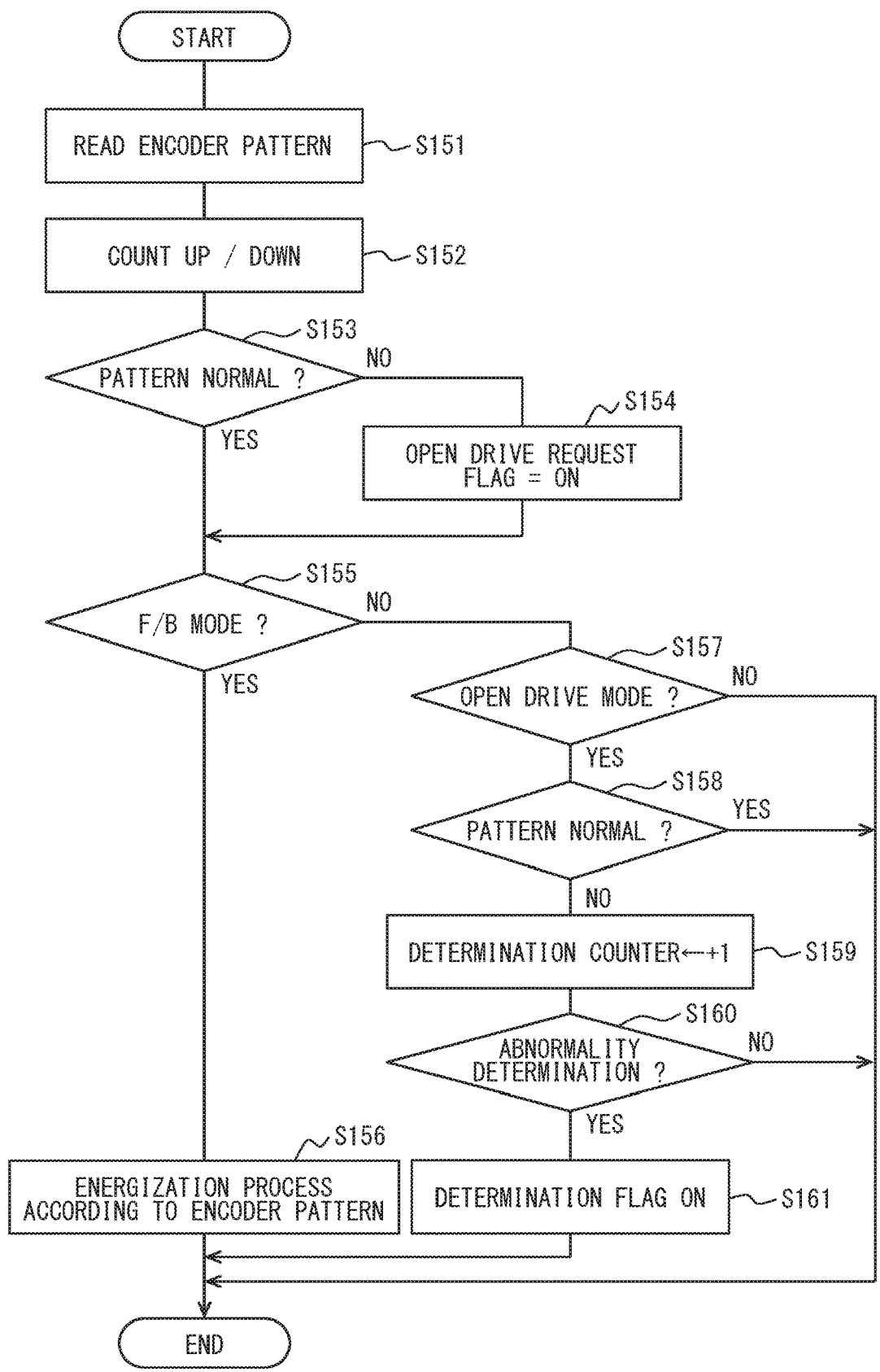
FIG. 8 is a flowchart illustrating an encoder interrupt process according to a second embodiment.
Figure 9:
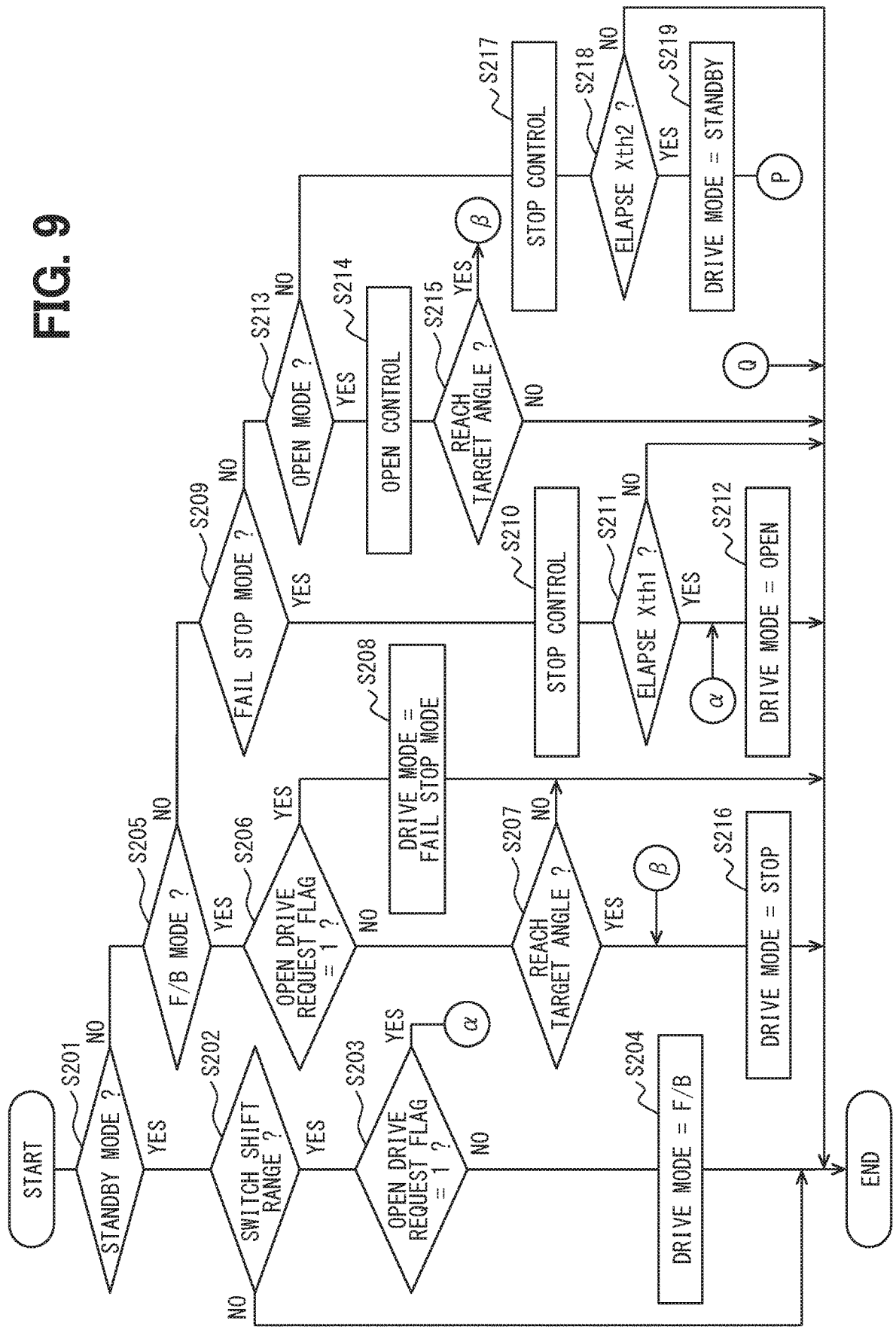
FIG. 9 is a flowchart illustrating a drive control process according to the second embodiment.
Figure 10:
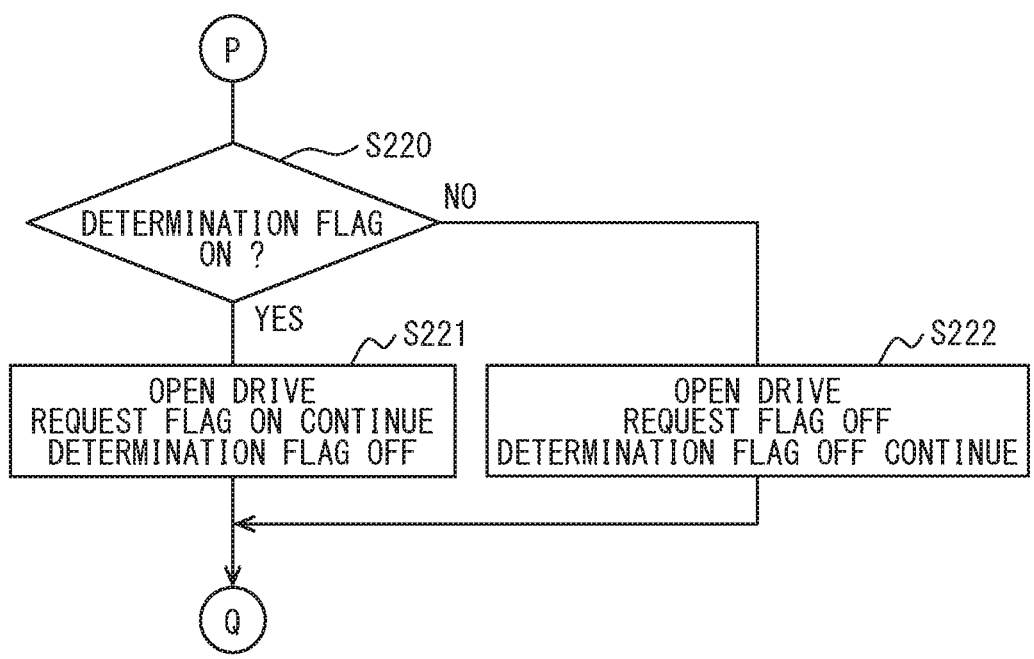
FIG. 10 is a flowchart illustrating a drive control process according to the second embodiment.

A second embodiment will be described with reference to FIGS. 8 to 10. In the present embodiment, after the abnormal pattern is detected, the monitoring of the encoder 13 is continued even during the open control, and a return control shifts the original control, when the encoder pattern returns to normal. The encoder interrupt process will be described based on the flowchart of FIG. 8.

Figure 5:
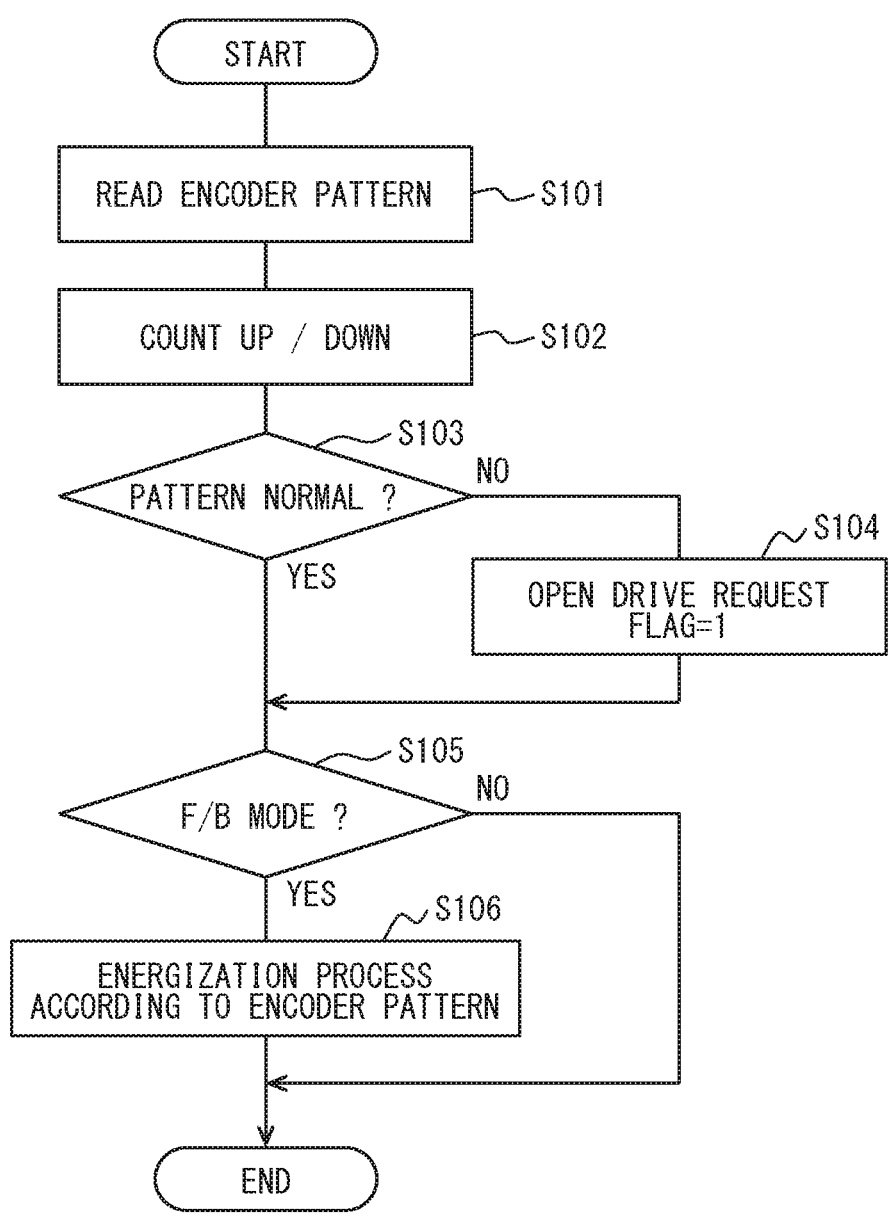
FIG. 5 is a flowchart illustrating an encoder interrupt process according to the first embodiment.

The processes of S151 to S156 are the same to the processes of S101 to S106 in FIG. 5. In S105, when it is determined that the drive mode is the F/B mode (S155: YES), the process proceeds to S156, and an energization process for energizing an energized phase according to the encoder pattern is performed as shown in FIG. 4B. When it is determined that the drive mode is not the F/B mode (S155: YES), the process proceeds to S157.

In S157, the drive control unit 55 determines whether the drive mode is the open drive mode. When it is determined that the drive mode is not the open drive mode (S157: NO), this routine ends. When it is determined that the drive mode is the open drive mode (S157: YES), the process proceeds to S158.

In S158, similarly to S153, the abnormality monitoring unit 52 determines whether the encoder pattern is normal. When it is determined that the encoder pattern is normal (S158: YES), this routine ends. When it is determined that the encoder pattern is not normal (S158: NO), the process proceeds to S159, and the abnormality determination counter is incremented.

In S160, the abnormality monitoring unit 52 determines whether the encoder abnormality has been determined. In the present embodiment, the encoder abnormality is determined when the count value of the abnormality determination counter becomes larger than the abnormality determination threshold. When it is determined that the encoder abnormality has not been determined (S160: NO), this routine ends. When it is determined that the encoder abnormality has been determined (S160: YES), the process proceeds to S161, and the abnormality determination flag is turned on.

The drive control process will be described with reference to the flowcharts of FIGS. 9 and 10. As shown in FIGS. 9 and 10, in the present embodiment, S220 to S222 are added after S219 in FIG. 6. After the stop control, in step S220, in which the drive mode is shifted to the standby mode in step S219, the abnormality monitoring unit 52 determines whether the abnormality determination flag is turned on. When it is determined that the abnormality determination flag is turned on (S220: YES), the process proceeds to S221. When it is determined that the abnormality determination flag is not turned on (S220: NO), the process proceeds to S222.

In S221, the ECU 50 continues the state in which the open drive request flag is turned on, and turns off the determination flag. In S222, when the open drive request flag is set, the ECU 50 turns off the open drive request flag and continues the OFF state of the determination flag.

Figure 11:
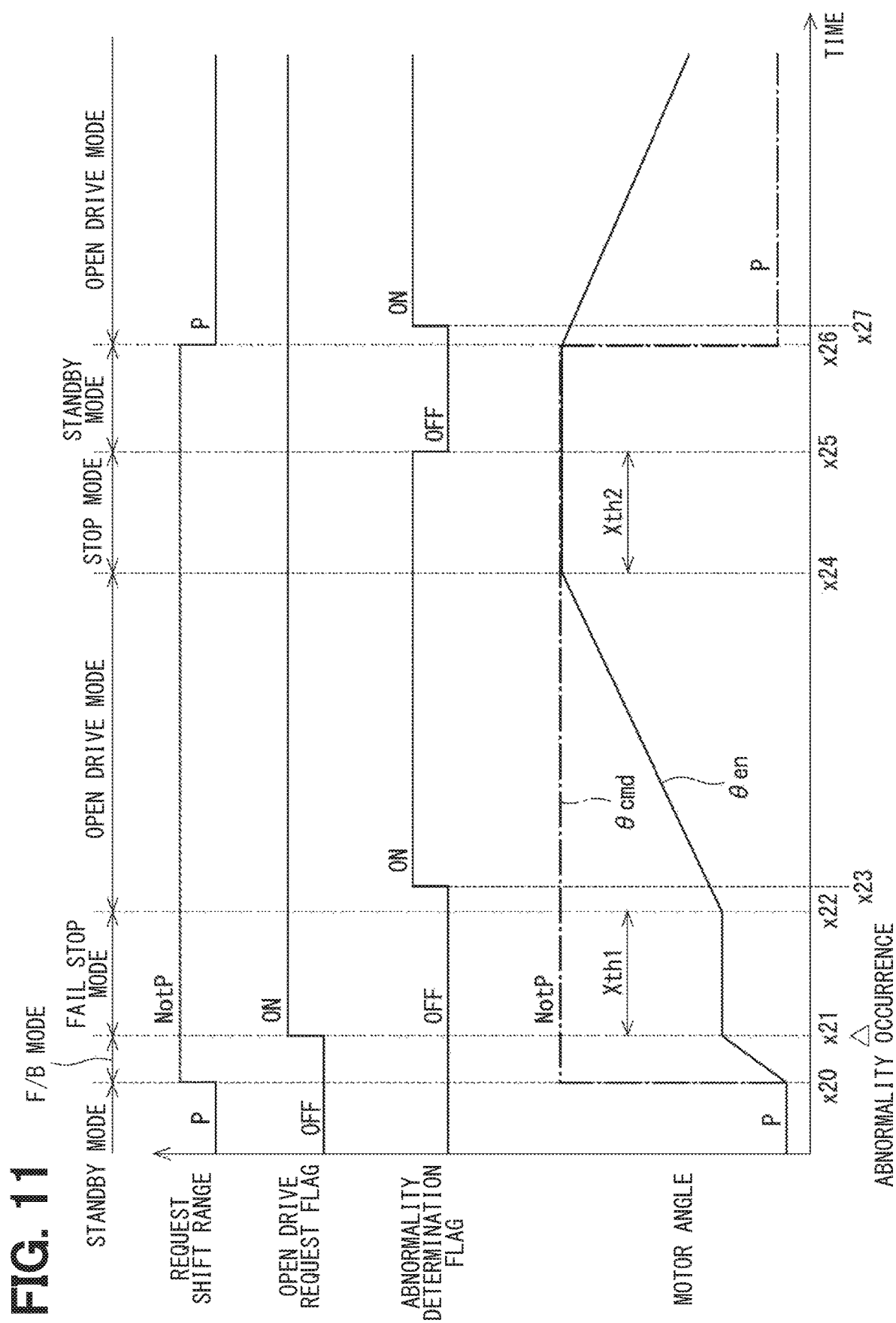
FIG. 11 is a time chart illustrating a motor drive process according to the second embodiment.
Figure 12:
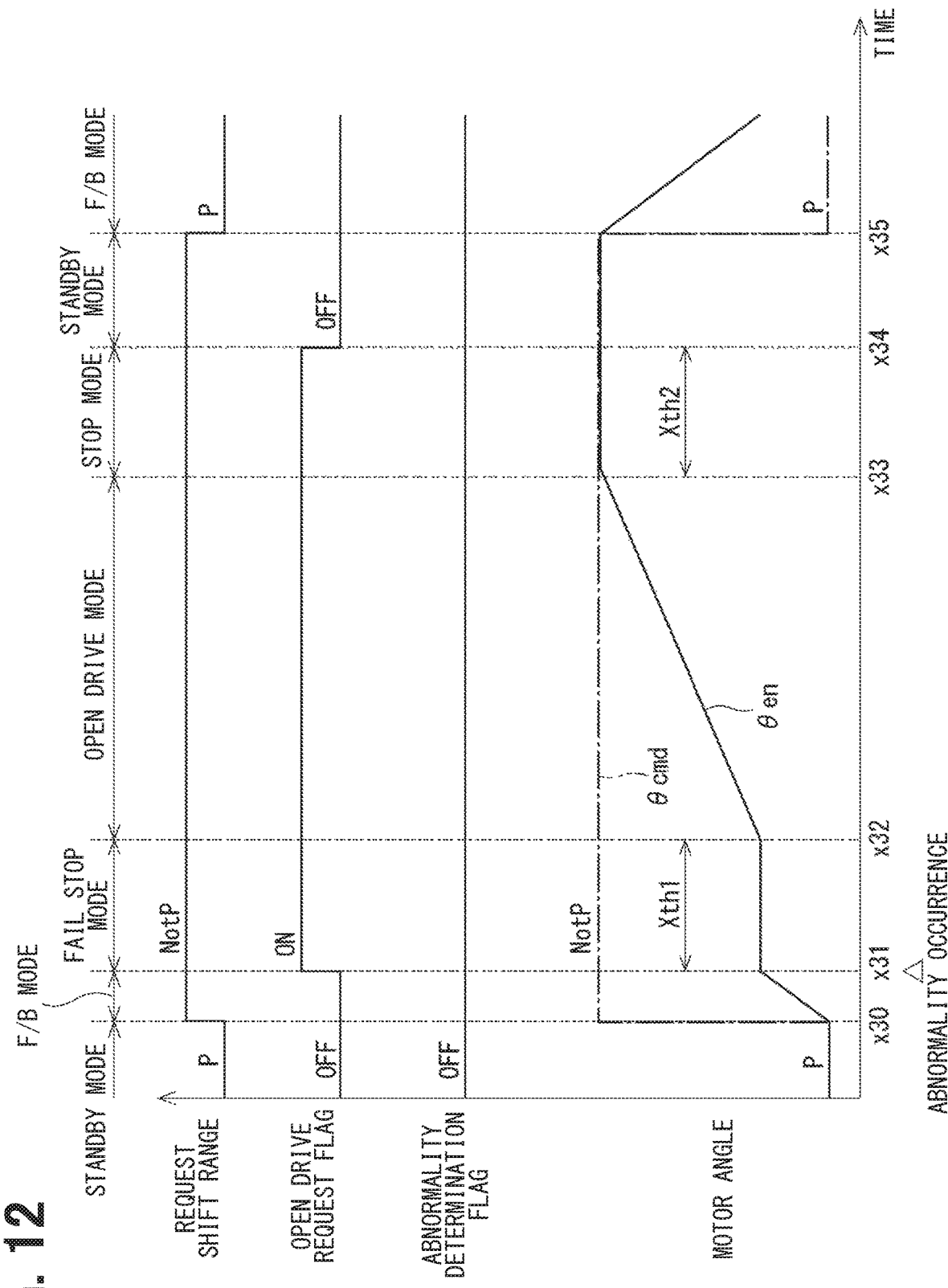
FIG. 12 is a time chart illustrating a motor drive process according to the second embodiment.

The motor driving process will be described with reference to the time charts of FIGS. 11 and 12. In FIGS. 11 and 12, the request shift range, the open drive request flag, the abnormality determination flag, and the motor angle are shown from the top of the vertical axis.

The process from time x20 to time x21 is the same as the process from time x10 to time x11 in FIG. 7. When an abnormal pattern of the encoder 13 is detected at the time x21, the motor 10 is stopped by performing the fixed phase energization in the fail stop mode, and then the mode is shifted to the open drive mode at the time x22. When one phase fixed in Hi state is generated due to the disconnection of the encoder 13, an abnormal pattern is generated every time the phase passes through the region to be set to Lo, and the abnormality determination counter is incremented. Then, when the abnormality is determined at time x23, the abnormality determination flag is turned on.

When the motor 10 is rotated by performing the open control and reaches the target position at the time x24, the mode is shifted to the stop mode. The motor 10 is stopped by performing the fixed phase energization, and then the mode is shifted to the standby mode at the time x25. At time x25 when the mode shifts to the standby mode, the abnormality determination flag is reset, but the open drive request flag is kept set.

At time x26, when the shift range is switched from the NotP range to the P range, the drive of the motor 10 is started again. At this time, since the open drive request flag is set, the motor 10 is driven by performing the open control from time x26. At time x27, similarly to time x23, when the abnormality is determined, the abnormality determination flag is turned on.

As shown in FIG. 12, the process from time x30 to time x32 is the same as the process from time x20 to x22 in FIG. 11. Here, if the abnormality detected at time x31 is a temporary abnormality due to noise or the like, the encoder pattern returns to normal, so that the abnormality is not determined and the abnormality determination flag is not set.

At time x33, when the rotation position of the motor 10 reaches the target position, the mode shifts from the open drive mode to the stop mode, and the motor 10 is stopped by performing the fixed phase energization. Then, at time x34 when the second determination time Xth2 has elapsed from time x33, the fixed phase energization is terminated, and the mode shifts to the standby mode. At time x34 when the mode has shifted to the standby mode, the open drive request flag is reset because the abnormality determination flag is not set.

At time x35, when the shift range is switched from the NotP range to the P range, the drive of the motor 10 is started again. At this time, since the open drive request flag is not set, the motor 10 is driven by performing the F/B control. That is, in the example of FIG. 12, even if a temporary abnormality occurs in the encoder 13, if the abnormality is not determined, the encoder 13 will return to normal at the next range switching. Therefore, the range switching can be performed with good responsiveness by performing the F/B control.

In the present embodiment, the drive control unit 55 returns the drive mode at the time of the next range switching to the normal state when the abnormality is not determined after the abnormality of the rotation angle signal is detected. Thereby, it is possible to prevent a temporary abnormality such as noise from being erroneously determined as a failure. Further, it is possible to avoid a decrease in responsiveness due to an erroneous determination of a failure. Thus, effects similarly to those of the embodiments described above will be produced.

Other Embodiments

According to the embodiments described above, the encoder is employed as the rotation angle sensor to detect the motor angle of the motor. In another embodiment, as long as the rotation angle sensor can output rotation angle signals having three or more phases different from each other, the rotation angle sensor is not limited to the encoder, and may be any type such as a resolver. Further, the number of phases of the rotation angle signal may be four or more.

According to the embodiments described above, the two recesses are formed in the detent plate. In another embodiment, the number of recesses is not limited to two, and for example, a recess may be provided for each range. The shift range switching mechanism and the parking lock mechanism or the like may be different from those in the embodiments described above.

In the embodiment described above, the decelerator is placed between the motor shaft and the output shaft. Although the details of the decelerator are not described in the embodiments described above, it may be configured by using, for example, a cycloid gear, a planetary gear, a spur gear that transmits torque from a reduction mechanism substantially coaxial with the motor shaft to a drive shaft, or any combination of these gears. As another embodiment, the decelerator between the motor shaft and the output shaft may be omitted, or a mechanism other than the decelerator may be provided. The present disclosure is not limited to the embodiment described above but various modifications may be made within the scope of the present disclosure.

The present disclosure has been described based on the embodiments. However, the present disclosure is not limited to the embodiments and the structures. The present disclosure includes various modifications and further includes modifications within the range of equivalency. Further, various combinations and forms, further, other combinations and forms including only one element or more, or less of them, are also included in the category and range of idea of the present disclosure.

In an assumable example, a motor control device switches a shift range of a vehicle by using a motor as a drive source. For example, in Patent Document 1 (JP 3849930), when a failure in a feed-back (F/B) control system of the motor is detected, a control of the motor is switched to open control that controls the driving of the motor without feeding back information on an encoder count value.

For example, in a two-phase encoder system of an A-phase and a B-phase as in Patent Document 1, if temporary chipping or noise superimposition occurs in one of an A-phase signal or a B-phase signal, the encoder count value is not synchronized with a rotation position of the rotor, and the motor stops. An object of the present disclosure is to provide a shift range control device that can appropriately switch a shift range even when an abnormality occurs in a signal from a rotation angle sensor.

A shift range control device according to the present disclosure controls switching of a shift range by controlling a drive of a motor, and includes a signal acquisition unit and a drive control unit. The signal acquisition unit acquires a rotation angle signal from a rotation angle sensor that can output rotation angle signals of three or more phases with different phases. The drive control unit controls the drive of the motor so that a rotation position of the motor becomes a target rotation position according to a target shift range. When an abnormality of the rotation angle signal is detected during switching of the shift range, the drive control unit performs fixed phase energization that continues energization to the same energized phase, and stops rotation of the motor.

In the present disclosure, a rotation angle sensor outputs rotation angle signals of three or more phases. Even if an abnormality occurs in one phase, the power is correctly supplied if the phase jumps over that phase, so that the motor may rotate as a result. Therefore, when an abnormality occurs in the rotation angle sensor, the motor is reliably stopped by performing the fixed phase energization. Thus, after the motor is stopped, the shift range can be appropriately switched by, for example, rotating the motor by open control or the like that does not use a detection value of the rotation angle sensor.

The invention claimed is:

1. A shift range control device for switching a shift range by controlling a drive of a motor, the shift range control device comprising:
    a signal acquisition unit configured to acquire a rotation angle signal from a rotation angle sensor that outputs rotation angle signals of three or more phases with different phases; and
    a drive control unit configured to control the drive of the motor so that a rotational position of the motor becomes a target rotational position according to the target shift range, wherein
    when an abnormality of the rotation angle signal is detected during switching of the shift range, the drive control unit performs fixed phase energization that continues energization to the same energized phase, and stops rotation of the motor.

2. The shift range control device according to claim 1, wherein
    the drive control unit detects the abnormality of the rotation angle signal during the switching of the shift range, stops the motor by performing the fixed phase energization, and shifts an open control that rotates the motor by switching the energized phase without using the rotation angle signal.

3. The shift range control device according to claim 1, wherein
the drive control unit returns the drive mode at a time of next range switching to the normal state when the abnormality is not determined after the abnormality of the rotation angle signal is detected.

4. The shift range control device according to claim 2, wherein
the drive control unit returns the drive mode at a time of next range switching to the normal state when the abnormality is not determined after the abnormality of the rotation angle signal is detected.

\* \* \* \* \*